June 12, 1951 C. J. EADES 2,556,802
CONTROL FOR VEHICLE SIGNALING DEVICES
Filed May 22, 1947 2 Sheets-Sheet 1
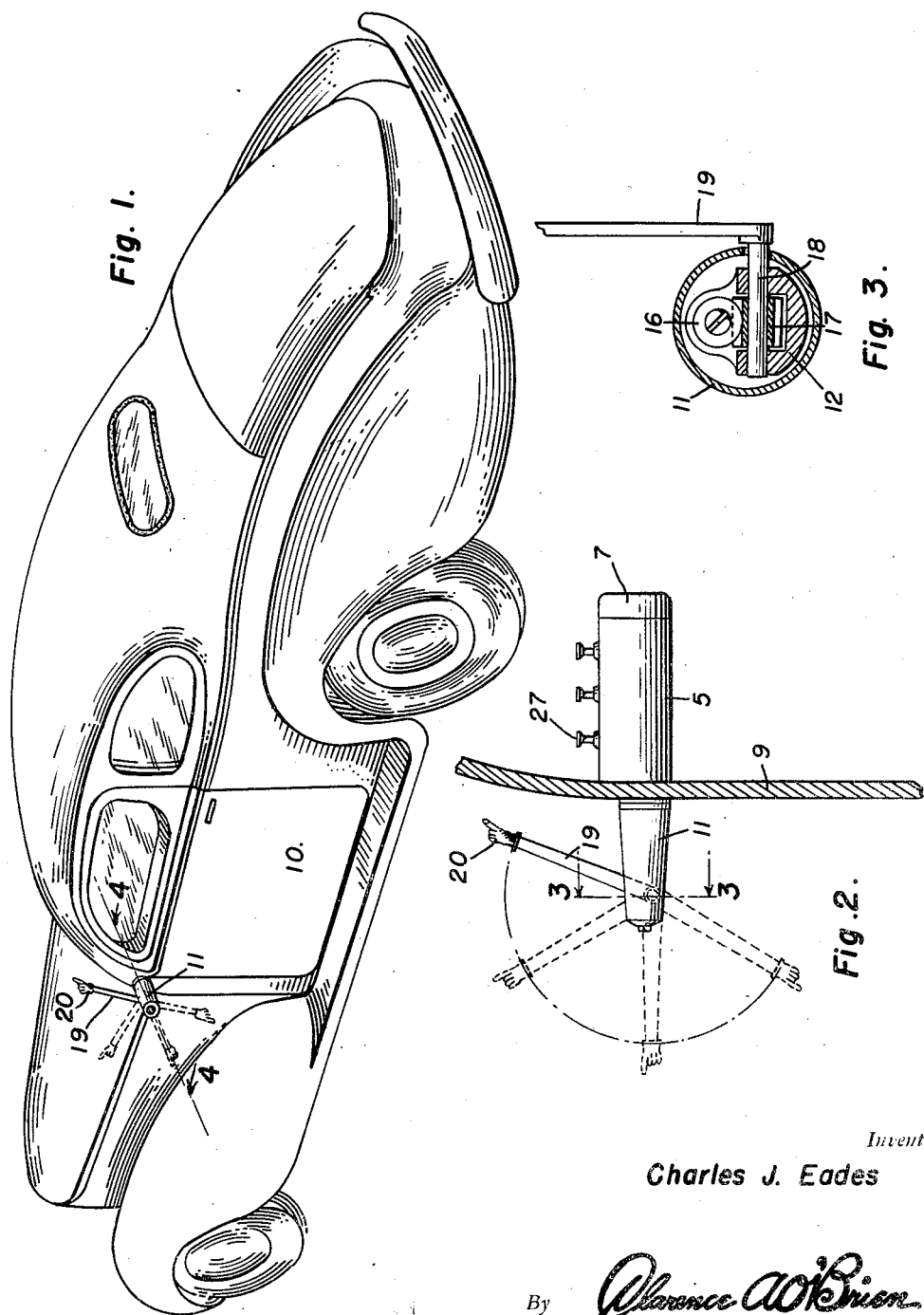
Inventor
Charles J. Eades
By Clarence A. O'Brien
and Harvey B. Jacobson
Attorneys June 12, 1951  C. J. EADES  2,556,802
CONTROL FOR VEHICLE SIGNALING DEVICES
Filed May 22, 1947  2 Sheets-Sheet 2
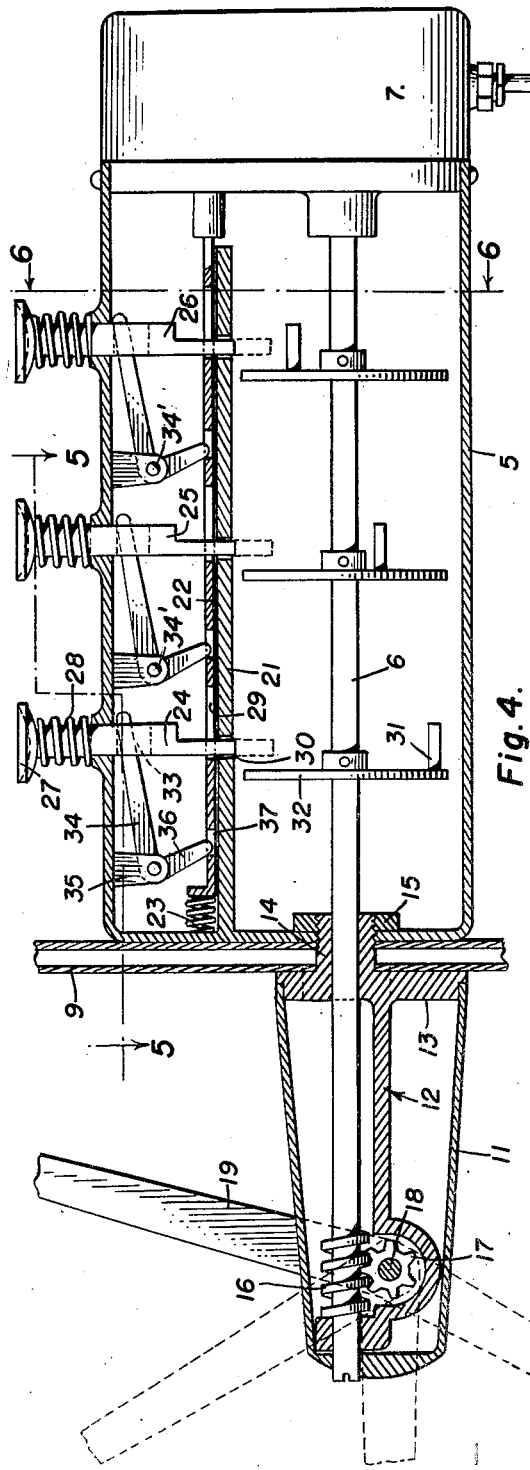
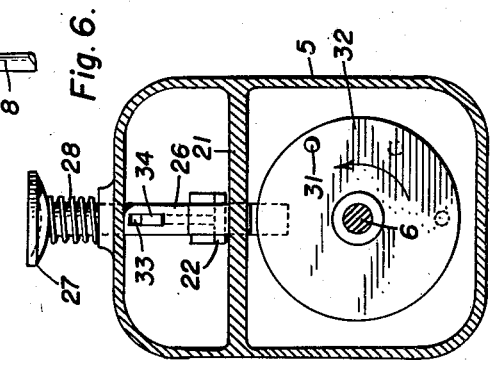
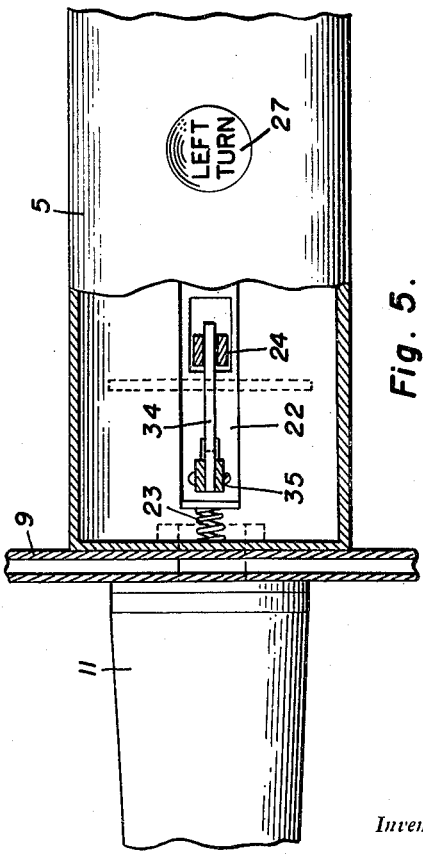
Inventor
Charles J. Eades Patented June 12, 1951

2,556,802

UNITED STATES PATENT OFFICE 2,556,802

CONTROL FOR VEHICLE SIGNALING DEVICES

Charles J. Eades, Winchester, Ky.

Application May 22, 1947, Serial No. 749,783

4 Claims. (Cl. 192—139)

The present invention relates to new and useful improvements in signalling devices and more particularly to a semaphore direction signal for automobiles and other motor driven vehicles.

An important object of the present invention is to provide a signalling device of this character including a swinging signalling arm operated by means of suction force obtained from the intake manifold of the engine of the vehicle and to provide novel control means for the arm whereby the latter may be moved into a desired signalling position in accordance with traffic regulations to indicate a right or left turn, or the intention of the driver to come to a stop.

A further object of the invention is to provide a device of this character of simple and practical construction, which is efficient and reliable in operation, relatively inexpensive to manufacture and install in operative position on the vehicle and which at the same time is neat and attractive in appearance and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view showing the signalling device in position on an automobile.

Figure 2 is a fragmentary sectional view of the automobile showing the portions of the device mounted inwardly and outwardly thereof.

Figure 3 is a sectional view taken on a line 3—3 of Figure 2.

Figure 4 is an enlarged sectional view taken on a line 4—4 of Figure 1.

Figure 5 is a fragmentary sectional view taken on a line 5—5 of Figure 4, and

Figure 6 is a transverse sectional view of the casing for the control mechanism of the signalling device taken on a line 6—6 of Figure 4.

Referring now to the drawings in detail wherein for the purpose of illustration I have disclosed a preferred embodiment of the invention the numeral 5 designates a casing for the control mechanism of the signalling device and having a shaft 6 journaled in the lower portion thereof with one end of the shaft projecting into a motor housing 7 secured at one end of the casing 5, the motor housing enclosing a conventional vacuum operated motor (not shown) such as used for the operation of windshield wipers and to which a vacuum line 8 is attached for connecting the motor to the intake manifold of the engine of a vehicle.

The other end of the casing 5 is positioned against the inner wall 9 of the side of an automobile 10 or other motor driven vehicle and positioned against the outer side of the automobile is a gear housing 11 which includes a casting designated generally at 12 having a base 13 at one end of the casting which forms the inner end wall of the housing 11. A bearing 14 projects from the base 13 through the wall 9 of the automobile and into the adjacent end of the casing 5 and is secured therein by a nut 15 threaded on the inner end of the bearing. The outer end of the shaft 6 is journaled in the bearing 14 and base 13 and projects into the housing 11.

A worm gear 16 is suitably secured to the outer end of the shaft 6 for driving a pinion 17 secured to a shaft 18 journaled in the outer end of the casting 12. One end of the shaft 18 projects laterally through the side of the gear housing 11 and to the outer end of which is secured one end of a signalling arm 19 having a hand 20 carried at its free end and which is preferably illuminated in a conventional manner.

The casing 5 is provided with a partition 21 in its upper portion and on which is slidably mounted a control bar 22 which has one end projecting into the motor housing 7 for cutting on and off the vacuum operated motor therein. A coil spring 23 is positioned between the other end of the control bar 22 and the adjacent end of the casing 5 and is arranged to move the bar 22 inwardly of the motor housing 7 to cut off the motor therein.

A plurality of plungers 24, 25 and 26 are slidably mounted in top of the casing 5 and are formed at their upper ends with push buttons 27. Coil springs 28 are mounted on the plungers under the push buttons or heads 27 to normally hold the plungers in a raised position. The lower ends of the plungers 24 are slidable vertically in slots 29 in the bar 22 which are aligned with openings 30 in the partition 21 and through which the plungers also project into the path of pegs 31 projecting at one side of disks 32 secured to the shaft 6.

The plungers 24 are also provided with openings 33 in which one end of bell crank levers 34 are loosely received, the levers being pivoted, as at 34', to brackets 35 in the top of the casing 5.

The ends 34 of the levers are substantially horizontal and the other ends 36 of the levers extend downwardly into openings 37 in the bar 22.

The push buttons 27 are labeled to indicate "right" and "left" turns and "stop" and the pins 31 carried by the disks 32 are arranged for engaging the respective plungers 24, when depressed, to interrupt the shaft 6 at different points in its rotation.

The type of vacuum motor employed reverses the direction of rotation of the shaft 6 when cut on and off and the shaft is rotated in a direction to raise the arm 19 and hold the same in an inwardly inclined position, as shown by the full lines in Figure 4, when the motor is cut off.

The plunger 24 represents the "stop" signal whereby upon depressing the plunger the lever 34 connected thereto will slide the control bar 22 toward the left to start the vacuum motor and rotate the shaft 6 to swing the arm 19 downwardly to its lowermost dotted line position, at which time the pin 31 will engage the plunger to hold the arm in such position. Upon releasing the plunger the spring 23 will slide the bar 22 toward the right to cut off the motor which then reverses the rotation of shaft 6 and returns the arm to its normal upper position.

Similarly by depressing the plunger 25 to indicate a "left" turn, the shaft will be rotated and stopped by pin 31 of the center disk to hold the arm 19 in a horizontal position and depressing the plunger 26 will cause the operation and stopping of the shaft to hold the arm in an upwardly and outwardly inclined position to indicate a "right" turn.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. Control means for a power operated shaft operatively connected to a signal comprising stop pins carried by the shaft, manually operated members slidably movable into the path of the pins to stop the shaft in selected positions, a motor for supplying power to the shaft, a motor control slide extending out of said motor, and levers recessed into said members and slide for operatively connecting the members to the slide.

2. Control means for a power operated shaft operatively connected to a signal comprising stop pins carried by the shaft, push button members slidably movable into the path of the pins to stop the shaft in selected positions, a motor for supplying power to said shaft, a motor control slide extending out of said motor parallel with said shaft, and levers positively connecting said members to said slide for operation of said slide by said members.

3. Control means for a power operated shaft operatively connected to a signal comprising stop pins carried by the shaft, a slidable control bar parallel with said shaft for cutting the power for the shaft on and off and provided with slots, a plurality of push button members slidably movable into the path of the pins through said slots to stop the shaft in selected positions, and an operative connection between each of the push buttons and the control bar.

4. Control means for a power operated shaft operatively connected to a signal comprising stop pins carried by the shaft, a slidable control bar parallel with said shaft for cutting the power for the shaft on and off and provided with slots, a plurality of push button members slidably movable into the path of the pins through said slots to stop the shaft in a selected position, and bell crank levers operatively connecting the push button members to the control bar to simultaneously operate the control bar with the movement of the push buttons into pin engaging position.

CHARLES J. EADES.

REFERENCES CITED

The following references are of record in the file of this patent:

UNITED STATES PATENTS

| Number | Name | Date |
|---|---|---|
| 1,509,160 | Mahony et al. | Sept. 23, 1924 |
| 1,694,616 | Blevins et al. | Dec. 11, 1928 |
| 1,930,159 | Crilly | Oct. 10, 1933 |
| 2,148,897 | Bonn | Feb. 28, 1939 |
| 2,369,779 | Forss | Feb. 20, 1945 |
| 2,393,591 | Cramer | Jan. 29, 1946 |